(12) United States Patent
Fuchs et al.

(10) Patent No.: US 6,322,872 B1
(45) Date of Patent: Nov. 27, 2001

(54) ROLLED PRODUCT OF METAL EXHIBITING A LIGHT-SPREADING SURFACE STRUCTURE

(75) Inventors: Roman Fuchs, Schaffhausen; Walter Hotz, Beringen, both of (CH)

(73) Assignee: Alusuisse Technology & Management Ltd., Neuhausen am Rheinfall (CH)

( * ) Notice: Subject to any disclaimer, the term of this patent is extended or adjusted under 35 U.S.C. 154(b) by 0 days.

(21) Appl. No.: 09/118,956

(22) Filed: Jul. 17, 1998

(30) Foreign Application Priority Data

Jul. 17, 1997 (EP) .................................. 97810506

(51) Int. Cl.⁷ ................. B32B 3/00; B32B 33/00
(52) U.S. Cl. ................ 428/141; 428/142; 428/469; 428/472; 428/472.2; 428/696; 428/698; 428/600; 428/687
(58) Field of Search .................... 428/141, 142, 428/469, 472, 447, 696, 698, 600, 687, 472.2

(56) References Cited

U.S. PATENT DOCUMENTS

| | | | |
|---|---|---|---|
| 5,403,657 | * | 4/1995 | Textor et al. ............ 428/336 |
| 5,527,572 | * | 6/1996 | Textor et al. ............ 428/472 |
| 5,582,863 | * | 12/1996 | Textor et al. ............ 427/162 |
| 5,663,001 | * | 9/1997 | Textot et al. ............ 428/469 |
| 5,811,917 | * | 9/1998 | Sekinger et al. ......... 313/336 |
| 5,904,989 | * | 5/1999 | Hanggi et al. ........... 428/457 |
| 5,919,561 | * | 7/1999 | Fuchs et al. ............ 428/336 |
| 5,975,976 | * | 11/1999 | Sekinger et al. ......... 445/50 |

FOREIGN PATENT DOCUMENTS

| | | |
|---|---|---|
| 475 784 | 9/1976 | (AU) . |
| 25 41 420 | 3/1977 | (DE) . |
| 296 20 783 | 7/1997 | (DE) . |
| 714 039 | 5/1996 | (EP) . |
| 762 152 | 3/1997 | (EP) . |
| 1 481 938 | 8/1977 | (GB) . |
| 57-192940 | 11/1982 | (JP) . |
| 8-24902 | 1/1996 | (JP) . |
| WO 96 08629 | 3/1996 | (WO) . |

* cited by examiner

Primary Examiner—Robert R. Koehler
(74) Attorney, Agent, or Firm—Cohen, Pontani, Lieberman & Pavane

(57) ABSTRACT

A rolled product of metal with at least one structured surface with light spreading structure. The structured surface exhibits a groove-type pattern in the form of a series of circular arc lengths that runs in the roiling direction and is wave-like in cross-section. The maximum angle of inclination of a tangent to the circular arc lengths with respect to a plane defined by the surface is 1 to 15°, and the radius of the arc lengths is between 0.1 and 20 mm.

14 Claims, 2 Drawing Sheets

ROLLED PRODUCT OF METAL EXHIBITING A LIGHT-SPREADING SURFACE STRUCTURE

BACKGROUND OF THE INVENTION

1. Field of the Invention

The invention relates to a rolled product of metal having at least one surface with a light-spreading structure. Also within the scope of the invention is a process for manufacturing such a rolled product.

2. Discussion of the Prior Art

Present day lighting methods for high standard lighting in work-places make use of grooved mirror lights that have a reflector made of highly reflective aluminium based materials. Computer work-places in particular require special non-dazzling lamps with high lustre aluminium reflectors, so called BAP lamps that deflect the light correctly downwards and outside about 45% produce only little scattered light (<200 candela/$m^2$, according to DIN 5035).

In many new developments such as e.g. secondary lighting, where the light source can no longer be seen directly, the high concentration of reflected light from the light source can be disturbing, if working with highly reflective surfaces. This effect is reinforced by use of the new T5 lamps that have significantly higher light densities. It is not possible to replace reflecting elements by diffuser surfaces, as scattered light is produced far from the reflecting angle, leading to a dazzling effect.

SUMMARY OF THE INVENTION

The object of the present invention is therefore to offer a structured surface with light spreading structure that reflects the light within a specific angle, but produces little scattered light beyond that angle. In addition, the surface should be simple, cost-favourable, recyclable and able to be manufactured in an industrial manner.

That objective is achieved by way of the invention in that the structured surface exhibits, in the rolling direction, a grooved structure that is wavy in cross-section in the form of a series of circular arcs or arc lengths having approximately the appearance of arcs, in which the maximum angle of inclination of a tangent to the arc lengths with respect to a plane defined by the surface is 1 to 15°, and the radius of the arc lengths lies between 0.1 and 20 mm.

In order to reduce the amount of scattered radiation, the roughness of the structured surface is preferably limited to a maximum value $R_a$ of 0.1 $\mu$m, preferably at most 0.05 $\mu$m, in particular at most 0.02 $\mu$m. The value $R_a$ is to be understood as the roughness after removal of the waviness due to the structure. The roughness value $R_a$ is defined in at least one of the standards DIN 4761 to 4768.

Preferred is an angle of inclination of 2 to 10°, preferably 3 to 8° and in particular 4 to 6°.

In a periodic structure the preferred values for the periodic distance lie between 0.01 and 10 mm, preferably between 0.05 and 0.5 mm and in particular between 0.1 and 0.4 mm. In a non-periodic structure the values for the periodic distance apply analogously to the width of the individual grooves.

The structure may exhibit a series of convex or concave shaped circular arc lengths. According to a further variant within the scope of the invention, both concave and convex circular arc lengths are present together in series, a preferred structure in particular being one in which the arc lengths are alternately convex and concave.

Although a periodic structure with a uniform arc radius is preferred, the radii on the same surface may be of different values and the grooved structure may also be in the form of a non-periodic structure.

For reasons of manufacture, or for storage purposes, instead of forming an edge, the transition between neighbouring lengths of arc or grooves may be be in the form of flat or rounded struts.

According to the invention the structured surface of the rolled product may be part of a sheet, strip or foil, said sheets, strips or foils preferably being of or containing aluminium or aluminium alloys, or the metals may be high lustre materials of aluminium or its alloys. In particular, aluminium or an aluminium alloy with aluminium of a purity in excess of 98.3 wt. % as its basis may be used.

Particularly favourable are rolled products according to the present invention the structured surface of which exhibits a structured surface layer that has been chemically, electrolytically or mechanically brightened, or anodised, or brightened and anodised.

Favourable is a structured surface that contains as superimposed layers, one or more layers of metals, semi-metals or their oxides, nitrides, sulphides or fluorides or mixtures thereof that have been deposited in vacuum.

Likewise favourable is a structured surface that features a brightened or anodised or brightened and anodised surface layer, and on this surface layer, as further superimposed layers, one or more layers of metals, semi-metals or their oxides, nitrides, sulphides or fluorides or mixtures thereof that have been deposited in vacuum.

At least one protective, transparent and corrosion resistant layer may be provided on the structured surface or surface layer.

On the structured surface there may also be at least one transparent layer that levels out the rilled pattern and has an optical refractive index that is sufficiently large to increase the refection of light.

Also, an underlayer and one or more layers of metals, semi-metals or their oxides, nitrides, sulphides or fluorides or mixtures thereof that have been deposited in vacuum as over-layers, may be provided on the structured surface.

An over-layer produced by a plasma-polymerisation process may also be provided on the structured layer.

An underlayer and one or more layers of metals, semi-metals or their oxides, nitrides, or fluorides or mixtures thereof, that have been deposited in vacuum may be provided as over-layers, and on top of that an overlayer that is deposited using the plasma-polymerisation process.

The under-layers on the structured surface may be deposited using the plasma-poly-merisation process.

The surfaces of sheets, strips or foils may be mechanically, electrolytically or chemically brightened. If the surface of the sheets, strips or foils has been anodised, then this anodising may be performed using various electrolytes such as acidic electrolytes of the following kind viz., sulphuric acid, phosphoric acid, tartaric acid, chromic acid and combinations thereof, using a direct or alternating current method. Batch or continuous strip anodising is possible.

Examples of a layer or layer systems comprising a plurality of layers deposited in vacuum onto the structured surface, or a surface layer already deposited (underlayer) may be for example:

As required, at least one bonding layer (layer A) such as e.g. a ceramic layer. Such layers may be or contain e.g.

compounds of the formula SiOx, where x represents a number from 1 to 2, or $Al_yO_z$ where y/z is a number from 0.2 to 1.5. Preferred is a bonding layer containing SiOx where x has the meaning described above.

A light reflecting layer (layer B) e.g. a metallic layer containing or comprising e.g. Al, Ag, Au, Cu, Cr or alloys e.g. containing at least one of the above mentioned elements.

As required, a transparent protective layer (layer C) e.g. comprising or containing oxides, nitrides, sulphides, fluorides etc. of alkali, e.g. Li, Na, K, alkali-earth e.g. Mg, Ca, Sr, Ba, and/or transition metals such as Sc, Ti, V, Cr, Mn, Fe, Co, Ni, Y, Zr, Nb, Mo, Te, Ru, Rh, Pd, Hf, Ta, W, Re, Os, Ir, Pt and/or lanthanides such as e.g. La, Ce, Pr, Nd, Pm, Dy, Yb or Lu etc. Examples are layers containing or comprised of PrTi-oxide and $MgF_2$ etc. Further, instead of only layer C, two or more transparent layers (Layers C, D, . . . ) with different refractive indices may be provided to increase the degree of reflectivity as a result of parallel light reflection at the phase boundary of layer C and Layer D or further layers.

In the case of a plurality of dielectric and transparent layers, the layer thicknesses are to advantage selected such that the incident light undergoes constructive interference at the phase boundaries ($\lambda/4$ layers).

Each of the above mentioned layers deposited in vacuum are e.g. 5 to 500 nm thick and the individual layers are preferably 5 to 100 nm thick.

Useful is a layer B. Preferred is a layer system containing a layer B and a layer C or a layer system containing a layer B, a layer C and a layer D.

The layers may be deposited onto the surface according to the invention or onto a layer already deposited there e.g. by gas phase or vapour phase deposition in vacuum (physical vapour deposition PVD), by thermal vaporisation, by electron beam vaporisation, with and without ion bombardment, by sputtering, in particular magnetron sputtering or by chemical gas phase deposition (chemical vapour deposition, CVP), with and without plasma support.

The layer or layer system may be deposited onto the surface in a process including degreasing the surface, charging the item bearing the surface to be treated in a vacuum unit, cleaning the surface e.g. by sputtering, glow discharge etc, if desired in a first step deposition of at least one light-reflecting layer e.g. a metallic layer (layer B), if desired in a third or second step and, if desired in a fourth or third step and in further steps deposition of at least one transparent layer (layer C, if desired layer D and further layers), and removal of the coated item from the vacuum chamber.

As underlayer or as over-layer one may provide e.g. organic coatings, PVD or CVD layers having a thickness e.g. of 0.5 $\mu$m and greater, or layers deposited by a plasma-polymerisation process; or layers of metal oxide and/or metal fluoride or metal sulphide may be employed.

For example, organic coatings or layers deposited by a plasma-polymerisation process may be employed as transparent protective scratch resistant and corrosion resistant layers. The transparent protective scratch resistant and corrosion resistant layer may also exhibit dirt repellent properties.

The surface structure according to the invention scatters the parallel incident light in one dimension. By using a spherical structure the light may be scattered in two dimensions. One example of such a spherical structure is a sequence of convex and/or concave spherical segments arranged in rows. One variant of the rolled structure according to the invention is therefore such that the structured surface features rows of concave and/or convex spherical segments, where the maximum angle of inclination of a tangent to the arc lengths with respect to a plane 1 defined by the surface is 15°, and the radii of the arc lengths lie between 0.1 and 20 mm.

The structured surface may exhibit a series of spherical segments having the same or different radii. Likewise, the spherical segments may be uniformly or non-uniformly distributed on the surface.

The present invention relates also to a process for manufacturing a rolled product of metal with at least one structured surface, in which a metallic body such as e.g. a rolling slab, clad sheet, strips or foils is shaped to a rolled product in one or as a rule in a plurality of rolling passes between at least two rolls.

The process according to the present invention is performed such that at least one roll of a roll pair features an embossed pattern, and the said pattern structures at least one surface of the rolled product in such a manner that (a) a groovetype pattern is formed in the rolling direction over the whole length of rolling, the grooved pattern exhibiting a wave-like cross-section with a periodic structure in the form of a series of arc lengths and the maximum angle of inclination of a tangent to the arc lengths with respect to a plane defined by the surface is 1 to 15° and the radius of the arc lengths lie between 0.1 and 20 mm, or (b) the structured surface exhibits a series of concave and/or convexly formed spherical segments in the form of a series of spherical segments, and the maximum angle of inclination of a tangent to the segment arc lengths with respect to a plane defined by the surface is 1 to 15°, and the radii of the segment arc lengths lie between 0.1 and 20 mm. Useful is a process for manufacturing a rolled product of metal having at least one structured surface, where a metallic body is shaped into a rolled product in one or more rolling passes between at least two rolls and in the process the structured surface is shaped from a metallic body having a brightened or anodised or brightened and anodised surface, or the structured surface features, as superimposed layers, one or more layers of metals, semi-metals or their oxides, nitrides, sulphides or fluorides or mixtures thereof, that have been deposited in vacuum, or the structured surface is shaped from a metallic body having a brightened or anodised or brightened and anodised surface, and this surface layer features, as further super-imposed layers, one or more layers of metals, semi-metals or their oxides, nitrides, sulphides or fluorides or mixtures thereof, that have been deposited in vacuum, or at least one protective scratch resistant and corrosion resistant layer is deposited onto the structured surface, or at least one transparent layer that levels out the rilled pattern and has an optical refractive index that is sufficiently large to increase the refection of light is deposited on the structured surface, or an underlayer that adopts the same topography is provided on the structured surface, and one or more layers of metals, semi-metals or their oxides, nitrides, sulphides or fluorides or mixtures thereof are deposited as overlying layers, or an overlayer is provided on the structured surface, or an underlying layer and one or more overlying layers of metals, semi-metals, or their oxides, nitrides, sulphides or fluorides or mixtures thereof are deposited on the structured surface and on top of that an overlayer.

A special surface layer is a layer system comprised of a pre-treatment layer, on which is a functional coating with organofunctional silanes of a metal compound, and on top of that a metal-containing reflection layer. Such a layer arrangement is described in detail in the Swiss patent application No. 2001/76 of 15.08.96.

The rolling operation is carried out e.g. such that a rolling blank of given thickness is rolled in one or more passes between two or more rolls or pairs of rolls and the surface of the rolled product is structured preferably in the last pass. Before the last pass the re-roll material may be given a preliminary profiling that favours or reduces material flow in the subsequent roll pass.

The surface of the rolls that give the rolled product the described structure are a negative of the structure desired on the rolled product. The structured roll may also be made of known materials such as steel, heat-treated, hardened or chromed steel. The negative structure may be obtained e.g. by chip-forming methods, grinding, milling, polishing, casting, using laser or electron beams or combinations thereof, by spark erosion, electrochemical or chemical removal or deposition processes etc. The process according to the invention is preferably performed in a continuous manner using strips or rolled material. After receiving their structured surfaces, the rolled products may be subjected to a stretching or straightening process and be divided into lengths as sheets or pieces of any desired dimensions or the rolls of material may be rolled up or coiled again.

It is possible e.g. to produce rolled products that exhibit the ribbed structure over the whole width. It is, however, also possible to produce rolled products with the ribbed structure only over specific areas across the width. The ribbed structure may be omitted e.g. at edge regions or in strips. Such variants can be achieved e.g. by using appropriately structured rolls.

A preferred use for the rolled product according to the invention is in the manufacture of light reflectors.

BRIEF DESCRIPTION OF THE DRAWINGS

Further advantages, features and details of the invention are revealed in the following description of preferred exemplified embodiments and with the aid of the drawing which shows schematically in FIG. 1 light indicatrix of differently structured surfaces.

DETAILED DESCRIPTION OF THE PREFERRED EMBODIMENTS

Figure 1:
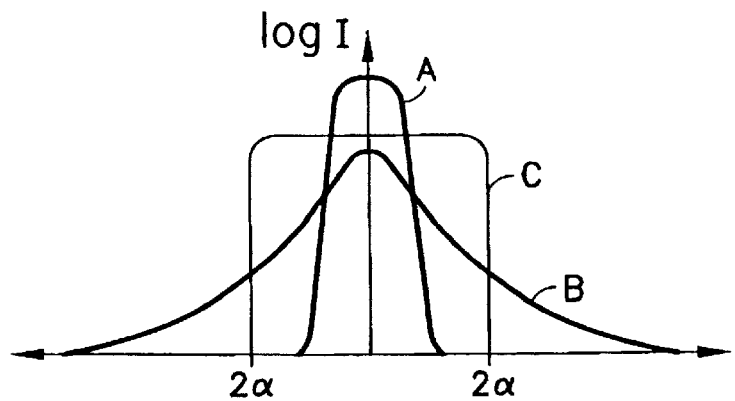

FIG. 1 shows the light indicatrix for three differently structured surfaces on a logarithmic scale. Curve A represents a commercially available highly lustrous surface, curve B a commercially available matt surface, and curve C a surface structured according to the invention which leads to a substantially more uniform intensity of reflectivity.

Figure 2A:
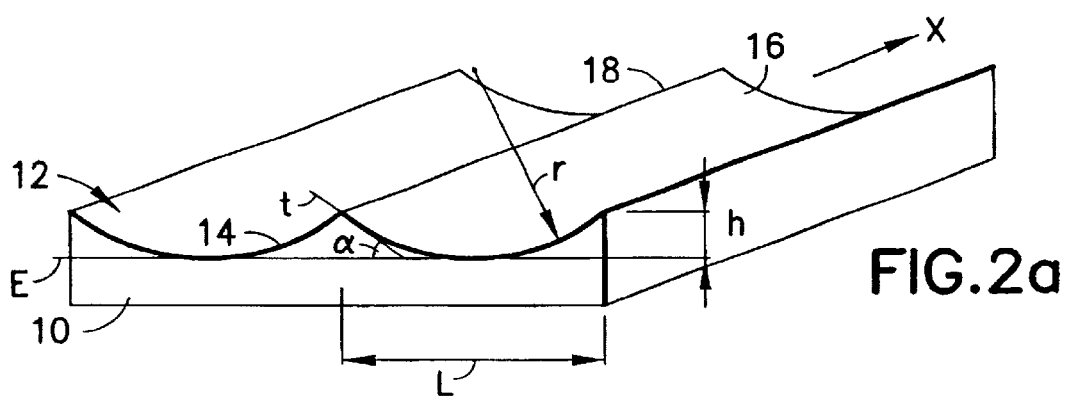
FIG. 2a–c cross-section through differently structured surfaces.
Figure 2B:
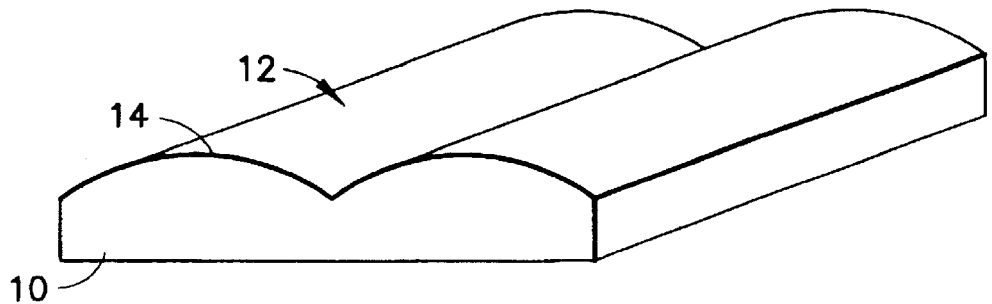
Figure 2C:
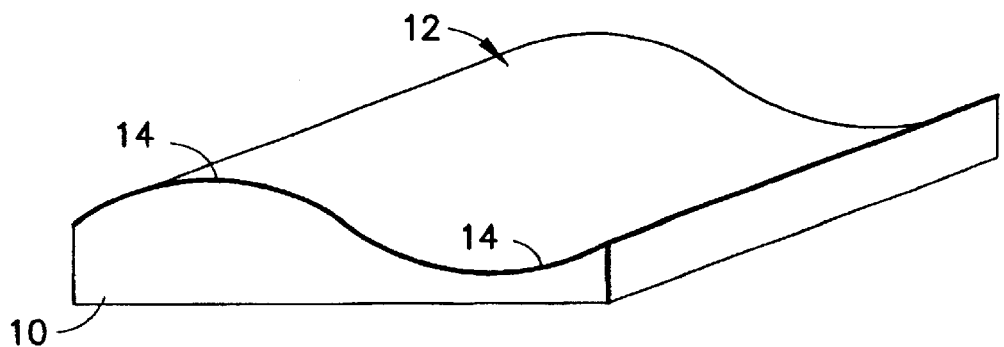

FIGS. 2a–c show three rolled products with differently structured surfaces 12. The grooved pattern running in the rolling direction x is wavy in cross-section with a periodic structure in the form of a series of circular arcs 14. The maximum angle of inclination $\alpha$ of a tangent t to the circular arc 14 with respect to a plane E defined by the surface 12 is for example 6° and the periodic length L is e.g. approximately 0.2 mm. From this one obtains an arc radius r of approx. 3 mm and a height h which is the maximum distance to which the structure extends from the plane E.

The version of a structured surface 12 shown in FIG. 2a is formed by grooves x that run in the rolling direction x and exhibit a common longitudinal edge 18. For reasons relating to the method of manufacture or storage factors, this edge 18 may be broader in the form of a flat or rounded strut. The cross-section of the structured surface 12 shown in FIG. 2a is made up of a series of concave circular arcs 14.

In the version shown in FIG. 2b the structured surface 12 is made up of convex circular arcs 14.

In the version shown in FIG. 2c the structured surface 12 is made up of alternating concave and convex circular arcs 14.

Figure 3:
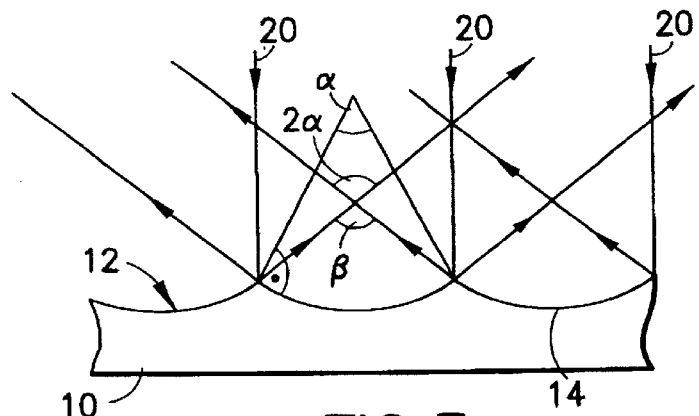
FIG. 3 reflection behaviour of a first version of a structured surface.

It should be mentioned at this point that the three structured surfaces shown in FIGS. 2a–c having the same arc radius T and periodic length L exhibit the same reflection characteristics. For reasons of simplicity the structured surfaces of versions of rolled product 10 shown in the FIGS. 3 to 5 each correspond to that shown in FIG. 2a As shown in FIG. 3, incident light rays 20 striking the structured surface parallel to a plane perpendicular to the groove or rolling direction x are reflected within an angle $\beta=2\alpha$, which leads to the desired spreading of the reflected light 20.

Figure 4:
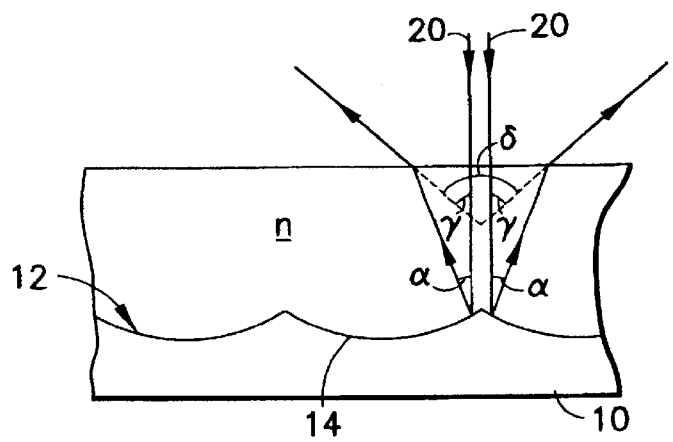
FIG. 4 reflection behaviour of a second version of a structured surface.

In the case of the rolled product 10 shown in FIG. 4 the structured surface 12 features a flattening transparent organic coating 22 with an optical refractive index n of e.g. 1.5. Light 20 striking the structured surface 12 is reflected symmetrical to the direction of impingement at an angle $\beta=2\alpha$. By the appropriate choice of refractive index n in the coating 22 the angle of scatter is increased to $\delta=2\gamma$.

Figure 5:
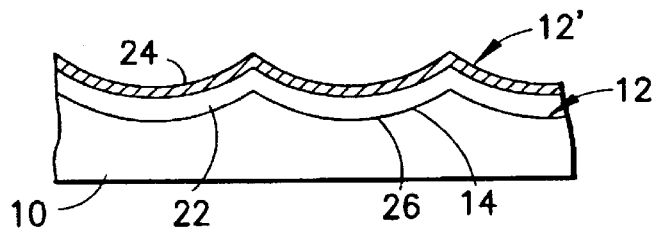
FIG. 5 reflection behaviour of a third version of a structured surface.

In the version of rolled product 10 shown in FIG. 5 an organic coating 22 is deposited in such a manner that it adopts the contour of the underlying surface structure i.e. exhibits the same arc radius r. As a result, a surface 12' identical to the structured surface 12 is obtained, however without the roughness pattern 26 produced by rolling. A reflecting layer 24—exhibiting better reflection characteristics due to the removal of the roughness—is then deposited on the coating 22, as this enables the fraction of scattered light to be reduced considerably.

Figure 6:
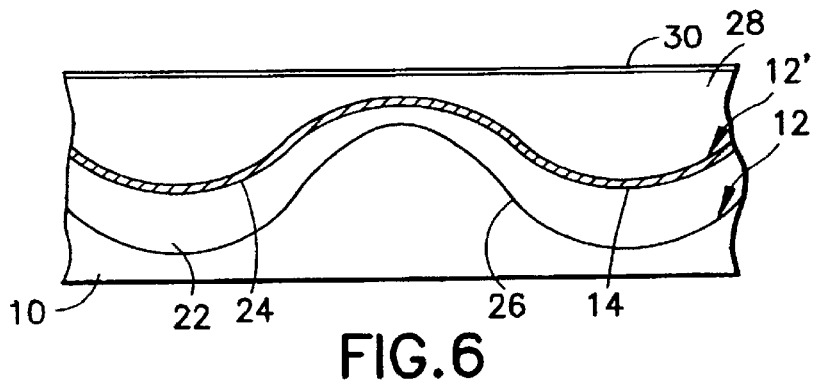
FIG. 6 reflection behaviour of a fourth version of a structured surface.

The rolled product 10 shown in FIG. 6 shows a similar layer structure to that shown in FIG. 5 In addition, the reflecting layer 24 here is covered over by a transparent protective layer 28 on the outside of which is deposited a dirt repellent and scratch resistant layer 30.

In the version shown in FIGS. 5 and 6 it has to be taken into account that, after the coating 22 has been applied, depending on the flow characteristics of the material used for that purpose, the roll-structured surface 12 is flattened to a greater or lesser extent. The roll-structured surface 12 must therefore be made such that the surface 12' obtained as a result of the flattening or smoothening by the coating 22 exhibits the desired topography. In practice this means that in general the roll-structured surface must exhibit an "initial inclination" which is greater than the "steepness" of the topography of the coating 22 or the reflecting layer 24 deposited on it. The different degrees of steepness of roll-structured surface 12 and the topography of the coating 22 with surface 12' are indicated in FIG. 6.

In the special version of rolled product 10 with additional coating 22, if the residual roughness of the initial structure is small, it is possible to omit an expensive brightening process, as the coating 22 is also capable of smoothing out this residual roughness (after removal of the waviness due to the structure).

The structures illustrated in the drawing are highly simplified here, and may in particular exhibit further coatings for promoting light reflection and/or protecting the surface.

What is claimed is:

1. A rolled metal product having a rolling direction and at least on structured surface with a light spreading structure and a maximum roughness value of 0.1 $\mu$m, the structured surface having a grooved patter that runs in the rolling direction of the metal product and is wavy in a cross-section so as to form a series of circular arcs having a radius between 0.1 mm and 20 mm, the circular arcs being configured so that a tangent to the circular arcs forms a maximum angle of inclination of 1 to 15° with respect to a plane defined by the structured surface.

2. A rolled product according to claim 1, wherein the grooved pattern has a periodic structure.

3. A rolled product according to claim 1, wherein the structured surface has a maximum roughness value of 0.05 $\mu$m.

4. A rolled product according to claim 3, wherein the structured surface has a maximum roughness value of 0.02 $\mu$m.

5. A rolled product according to claim 1, wherein the circular arcs are configured so that the tangent to the circular arcs forms a maximum angle of inclination of 2 to 10° with respect to the plane defined by the structured surface.

6. A rolled product according to claim 5, wherein the angle of inclination is 3 to 8°.

7. A rolled product according to claim 6, wherein the angle of inclination is 4 to 6°.

8. A rolled product according to claim 2, wherein the periodic structure of the grooved pattern has a periodic length of 0.01 to 10 mm.

9. A rolled product according to claim 8, wherein the periodic length is 0.02 to 5 mm.

10. A rolled product according to claim 9, wherein the periodic length is 0.05 to 0.5 mm.

11. A rolled product according to claim 10, wherein the periodic length is 0.1 to 0.4 mm.

12. A rolled product according to claim 1, wherein the pattern of the structured surface includes at least one of convex and concave circular arcs.

13. A rolled product according to claim 12, wherein the structured surface has alternating convex and concave circular arcs.

14. A rolled product according to claim 1, wherein the structured surface is part of one of a sheet, a strip and a foil.

* * * * *